United States Patent [19]

Tinker

[11] Patent Number: 5,399,445
[45] Date of Patent: Mar. 21, 1995

[54] BATTERY CASE LEAKAGE DETECTOR

[75] Inventor: Lawrence A. Tinker, Woodstock, Ga.

[73] Assignee: AER Energy Resources, Atlanta, Ga.

[21] Appl. No.: 229,368

[22] Filed: Apr. 18, 1994

[51] Int. Cl.$^6$ .......................................... H01M 10/48
[52] U.S. Cl. .................................... 429/90; 429/92
[58] Field of Search ................ 429/90, 91, 92, 93; 73/40

[56] References Cited

U.S. PATENT DOCUMENTS

| | | | |
|---|---|---|---|
| 675,708 | 6/1901 | Blackwell | 429/90 |
| 684,697 | 10/1901 | Lloyd | 429/90 |
| 4,222,745 | 9/1980 | Cloyd | 429/90 X |
| 4,702,563 | 10/1987 | Parker | 429/90 X |
| 4,702,564 | 10/1987 | Parker | 429/90 X |
| 4,727,006 | 2/1988 | Malinowski et al. | 429/90 X |

FOREIGN PATENT DOCUMENTS

| | | |
|---|---|---|
| 0068673 | 6/1979 | Japan ........................... 429/90 |
| 59-51546 | 3/1984 | Japan . |
| 2164200 | 3/1986 | United Kingdom . |
| 0388320 | 6/1973 | U.S.S.R. ........................ 429/90 |

Primary Examiner—Anthony Skapars
Attorney, Agent, or Firm—Jones & Askew

[57] ABSTRACT

A metal-air battery leakage detector is disclosed which uses a wicking material to absorb and propagate leaking electrolyte to a leak detection means so that the detection means is activated regardless of whether the leak is occurring in the vicinity of the detection means. In a first embodiment a substance that chemically reacts with electrolyte to change color is impregnated into the wicking material as the leak detection means. In the second embodiment electrodes are embedded in the wicking material and wired to an electrical circuit that is responsive to the presence of electrolyte as the leak detection means. In either case, a user has immediate knowledge of an electrolyte leak occurring inside a battery casing so that the battery can be removed from service before the leaking electrolyte can cause harm.

11 Claims, 5 Drawing Sheets

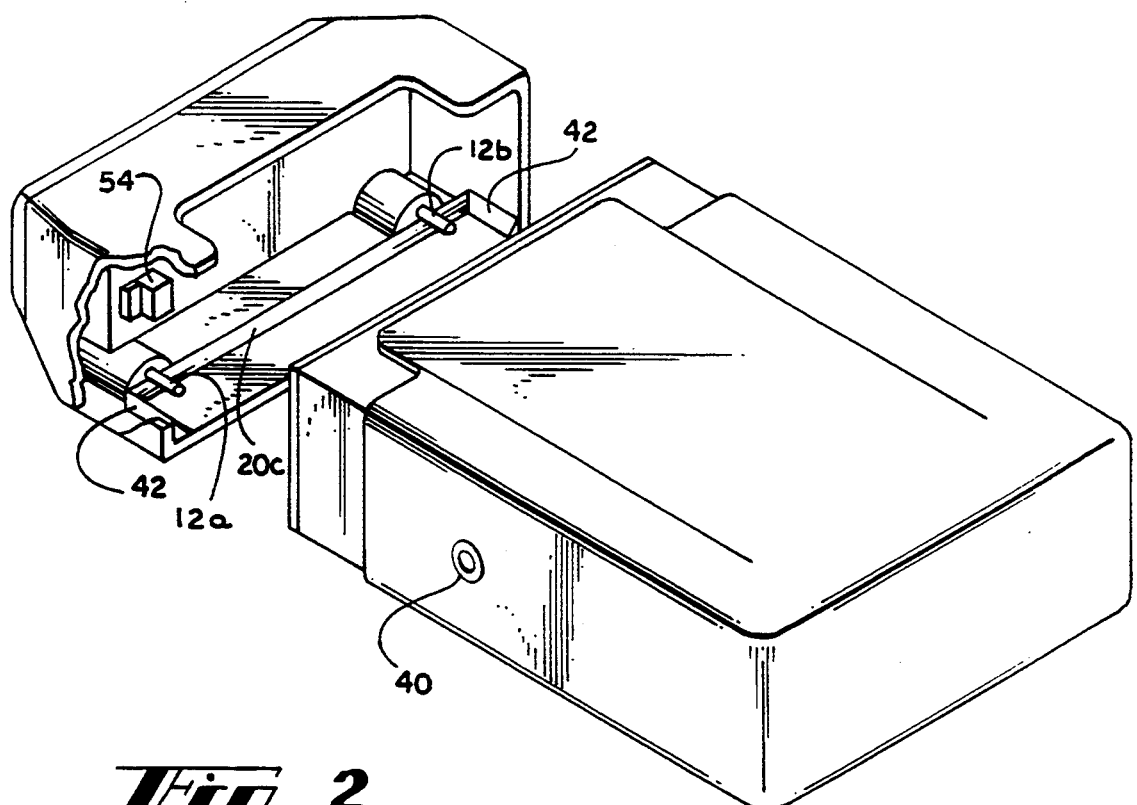
Fig_2
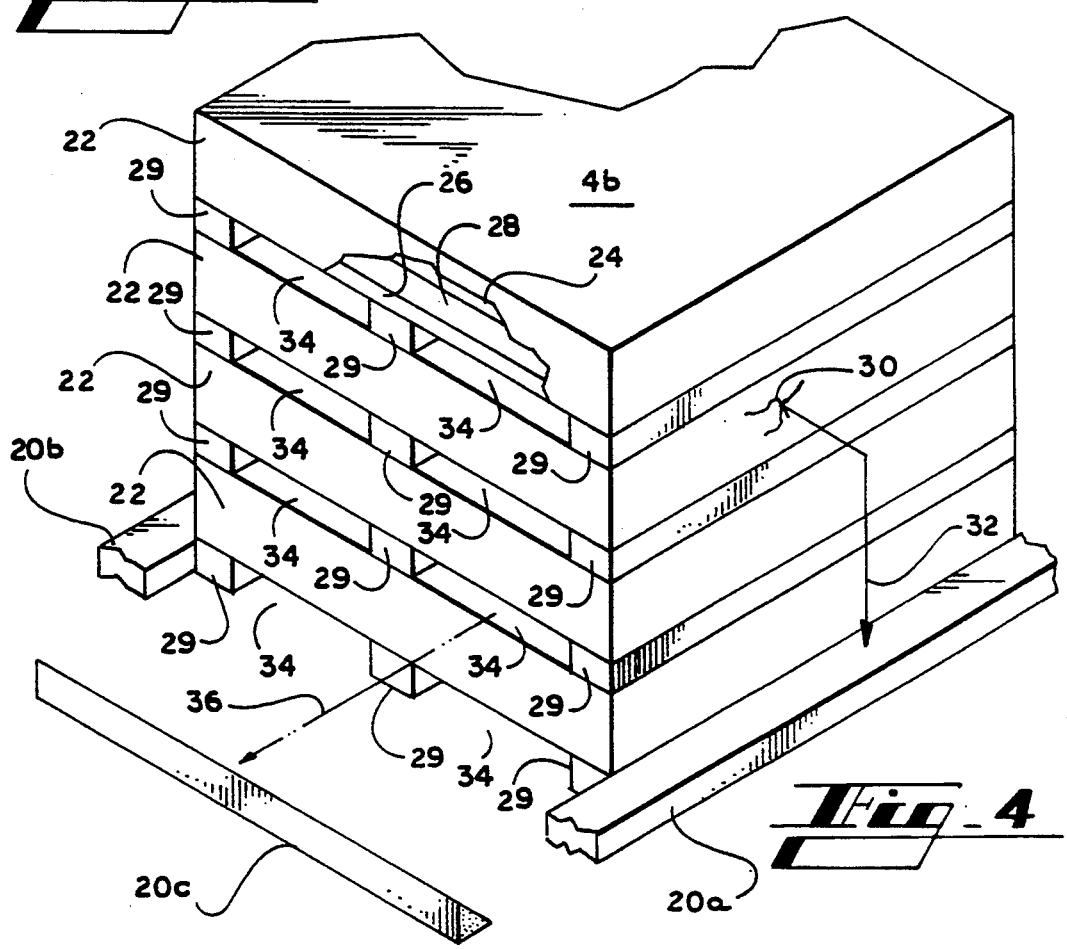
Fig_4

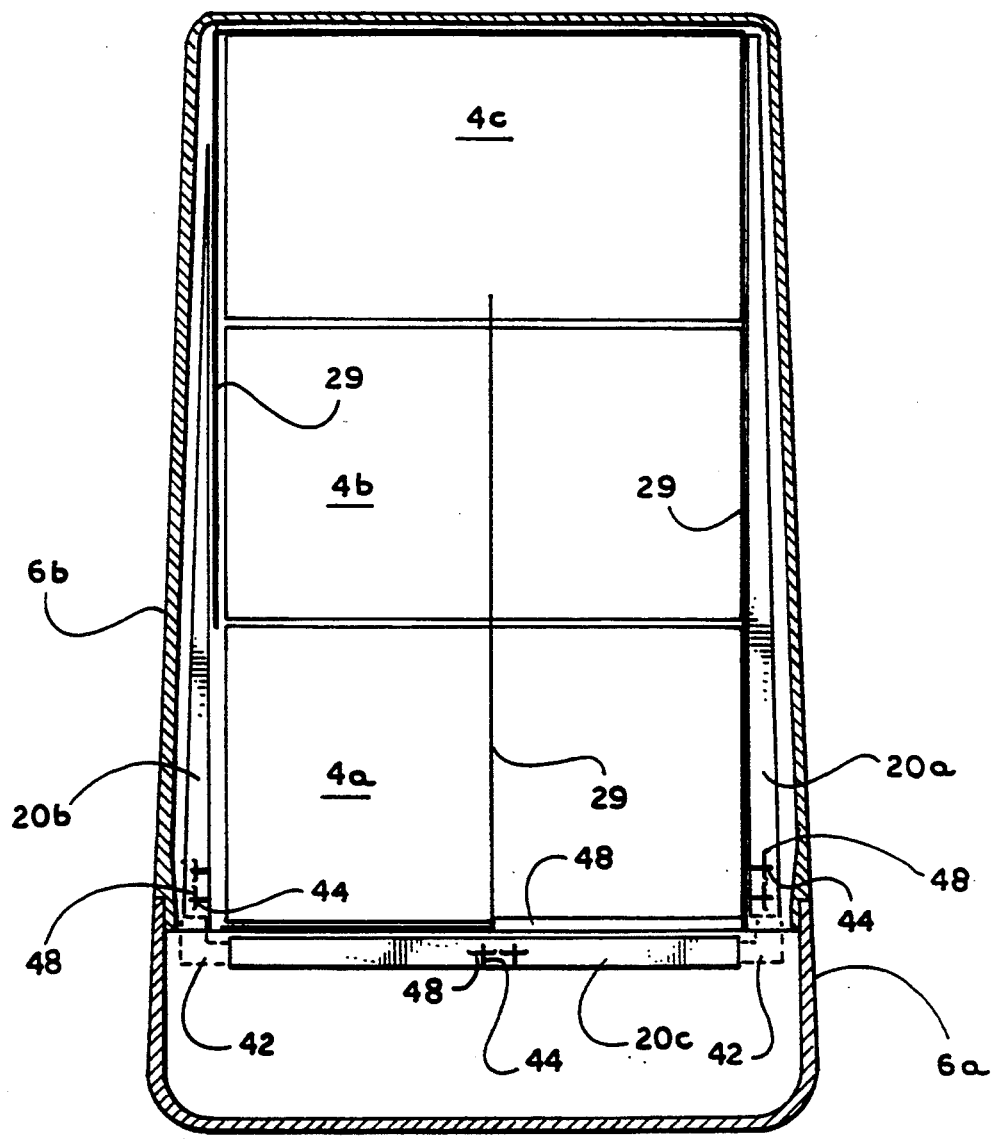
Fig_3

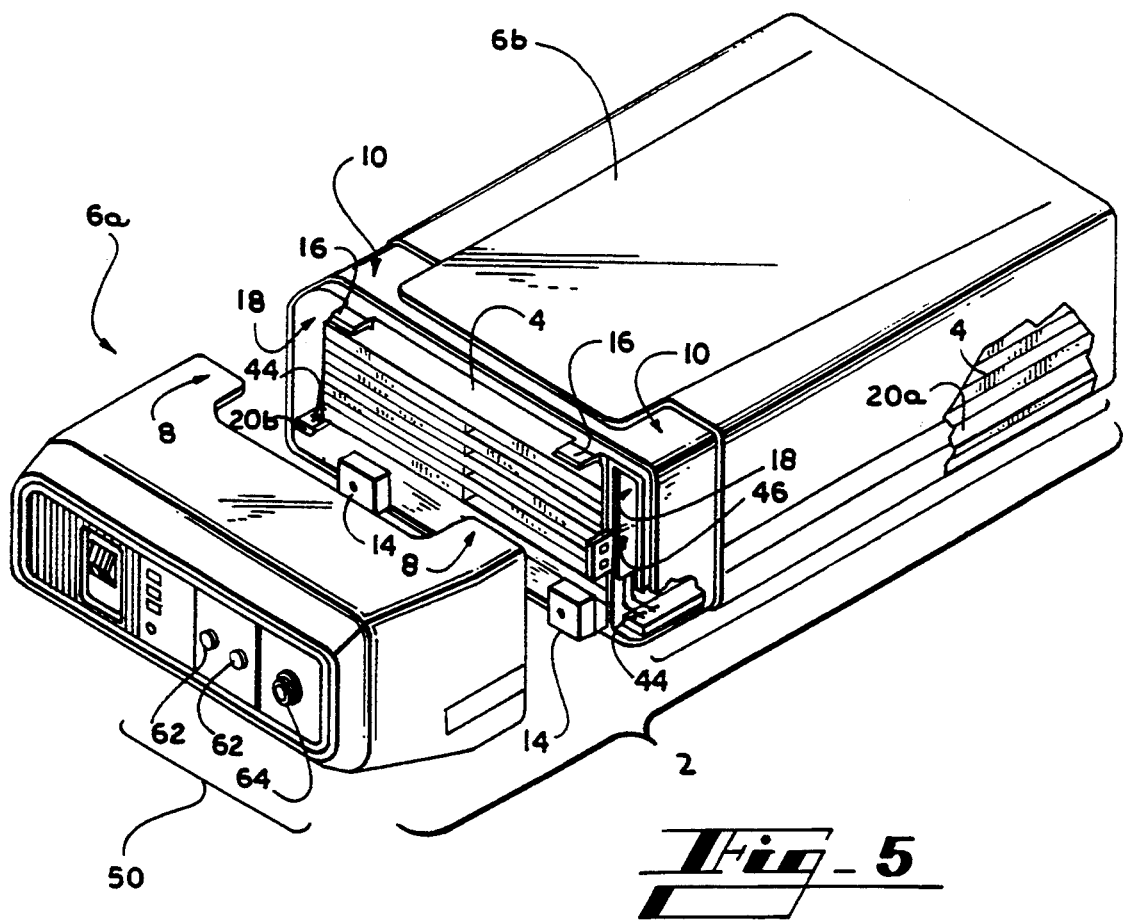
Fig_5
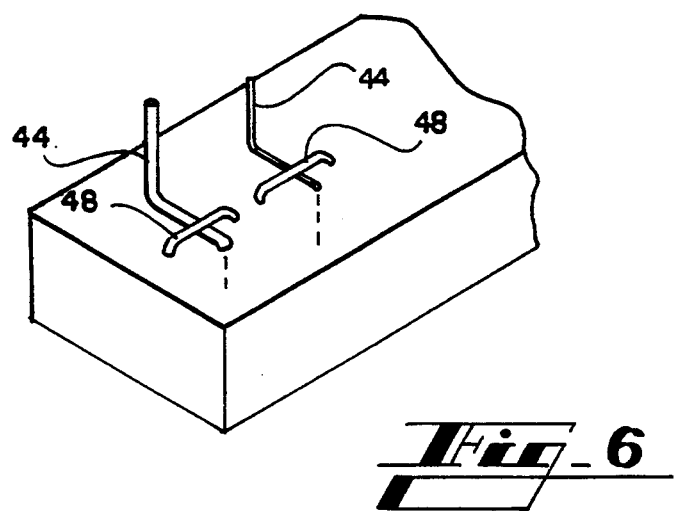
Fig_6

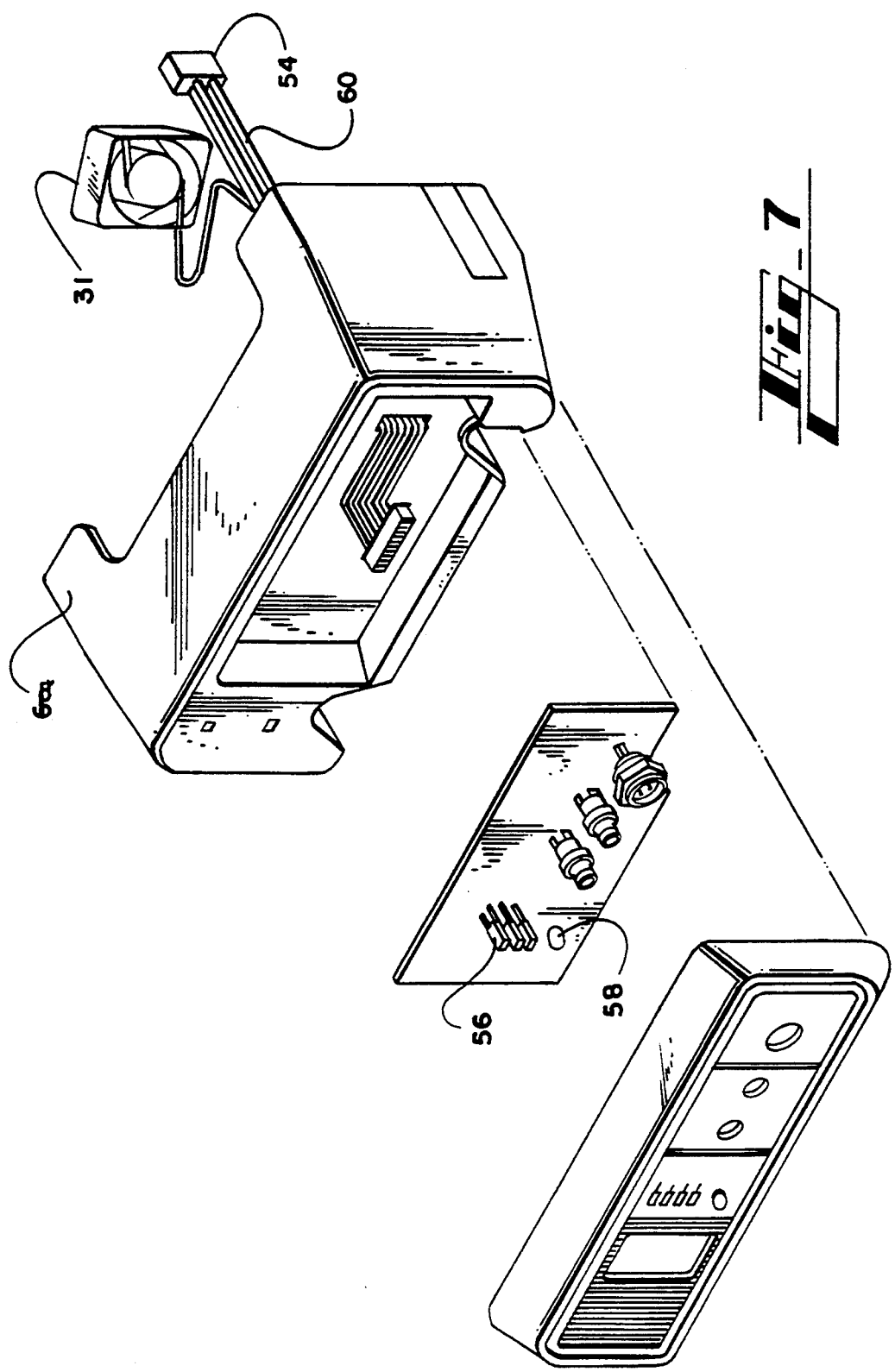

BATTERY CASE LEAKAGE DETECTOR

TECHNICAL FIELD

The present invention relates generally to batteries, and more particularly to an electrolyte leakage detector for metal-air batteries.

BACKGROUND OF THE INVENTION

Metal-air batteries are comprised of multiple electrochemical cells. Each cell is further comprised of an air permeable cathode and a metallic anode separated by an aqueous electrolyte. Metal-air batteries have a relatively high energy density because they utilize oxygen from ambient air as a reactant in the electrochemical reaction rather than a heavier material such as a metal oxide or other depolarizable metallic composition. For example, during discharge of a zinc-air battery cell, oxygen from ambient air is converted at the cathode to hydroxide ions, zinc is oxidized at the anode, reacts with the hydroxide ions, and water and electrons are released to provide electrical energy.

The anodes are made from metals which can be oxidized during discharge in a metal-air cell to produce electrical energy. Such metals include lead, zinc, iron, cadmium, aluminum and magnesium. Zinc is normally preferred because of the availability, energy density, safety, and relatively low cost of zinc.

A suitable electrolyte is an aqueous electrolyte including group I metal hydroxides such as LiOH, NaOH, KOH, CsOH, or the like.

Battery cells that are used for only a single discharge cycle are called primary cells, and cells that are rechargeable and useful for multiple discharge cycles are called secondary cells. An electrically rechargeable metal-air cell is recharged by applying voltage between the anode and cathode of the cell and reversing the electrochemical reaction. During recharging, the cell discharges oxygen to the atmosphere through the air permeable cathode and the anode is electrolytically reformed by reducing to the base metal the metal oxides formed during discharge.

Metal-air battery cells are often arranged in multiple cell battery packs within a common casing to provide a sufficient amount of power output. The casing is necessary to seal-off the cells from the ambient air to prevent self discharge of the cells during periods of non-use, which would result in a decreased battery output and life time. When in use, small ventilation holes in the housing are open to allow for ambient air to flow across the air cathodes of the metal-air cells.

Metal-air batteries provide a relatively light weight and compact power supply because they use oxygen from ambient air as a reactant in the electrochemical reaction. Due to the light weight and compactness of metal-air batteries, they are an ideal source of power for portable equipment.

Most electrochemical batteries use corrosive electrolytes and are susceptible to damage and leakage. Metal-air batteries are especially so due to their use of oxygen from the ambient air as a reactant. Because the air electrode in a metal-air cell is exposed to the outside environment, flooding of the electrode can cause the cell to leak. Additionally, if oxygen is not properly exhausted to the atmosphere during recharge of a secondary metal-air battery cell, oxygen pressure inside the cell may cause the cell to leak due to a breach of the air electrode structure.

Cell leakage is a potential problem in many batteries including metal-air batteries because they use caustic electrolytes which are corrosive in their aqueous form. Therefore, it would be beneficial to be able to determine whether the cells of a metal-air battery are leaking electrolyte so that the battery can be removed from service to reduce the risk of damage to the equipment being used in conjunction with the battery.

However, because metal-air batteries require a sealed casing for efficient use, routine visual inspection of the cells for leakage is not possible. Therefore, there exists a need for a battery leakage detector that immediately informs a user of electrolyte leakage occurring inside the battery casing, gives an indication of that leakage and prevents the leaked electrolyte from further escaping to the outside of the battery casing.

Various structures have been proposed for detecting and indicating battery leakage. For example, U.S. Pat. No. 4,222,745 to Cloyd, Great Britain Patent No. 2,164,200 to Babi, U.S. Pat. No. 684,697 to Lloyd, U.S. Pat. No. 675,708 to Blackwell, and Japanese Patent No. 59-51546 to Shimizu, disclose such detectors. Cloyd proposes a paste-like composition of potassium dichromate absorbed on finely divided silica and a polymeric adhesive material to detect leakage of sulfur dioxide from a battery cell. The composition is applied to vertical and horizontal services of a battery cell or battery casing. Upon leakage of sulfur dioxide into the composition, the composition changes colors from a yellow to a bluish green, indicating that a hazardous condition exists.

The goal of Cloyd appears to be merely to detect and indicate the leakage of sulfur dioxide once the leak has spread to the composition. However, at that time, the hazard of injury or damage from the leaking electrolyte may have already existed for some time. Additionally, the composition does not prevent leaked electrolyte from further escaping outside of the battery casing.

Babi discloses a composition of matter that changes color when a non-aqueous electrolyte leaks onto the composition. Like Cloyd, the composition only indicates an electrolyte leak once the leak has spread to the composition. Also like Cloyd, the composition does not prevent the further escape of the leaking electrolyte.

Lloyd describes a battery draining box which electrically detects battery leakage and activates an electrical alarm. The draining box includes a drain pipe which leads to a conductive bowl and then to a boot. The conductive bowl has a tail which is connected to a device with a spring such that the bowl is held directly in the, middle of the drain pipe. The alarm device has one contact wired to the drain pipe and the other wired through the battery to a tail of the conductive cup. When solution leaks from a battery, the drain box collects the solution and sends it into the drain pipe where it drips into the bowl. When the bowl is sufficiently full, the weight of the bowl overcomes the spring causing the bowl to tilt downwards and contact the side wall of the drain pipe. This completes the electrical circuit and causes the alarm to activate. In another embodiment, Lloyd describes the use of two electrical contacts in the drain pipe. The alarm circuit is completed when leaked electrolyte passes between the contacts.

Lloyd is impractical in requiring a drain box, pipe and boot which add considerable weight and bulk to a battery. Further, Lloyd allows the leaked solution to remain free in an open tray where it can be splashed, spilled, or otherwise escape and cause injury or damage. Additionally, Lloyd requires the battery to remain at a fixed orientation. Thus, it is not a feasible for portable batteries which are transported and used at various orientations.

Blackwell describes an open tray for holding battery cells. The tray bottom is lined with zinc. Carbon elements are electrically wired together to extend across the tray above, but not in contact with, the zinc bottom. An alarm device has one pin wired to a binding post in contact with the zinc bottom and has a second pin wired to a binding post connected to the carbons. When a battery cell resting in the tray leaks a sufficient amount of conductive liquid to complete the electrical circuit between the zinc bottom and the carbon elements suspended above, an electrical alarm is activated.

Blackwell, which uses an open tray similar to Lloyd, is also not feasible for portable batteries. Further, Blackwell uses multiple large electrical contacts which add a relatively large amount of weight and bulk to the battery. Thus, like Lloyd, Blackwell is not practical for portable batteries that must be compact and relatively light weight.

Shimizu describes a vacuum deposited film of Tungsten Oxide ($WO_3$) which changes from non-conductive to conductive when in contact with an electrolyte. The film is connected to a battery and provides a bridge between electrical contacts. When leaking electrolyte comes in contact with the film, the film creates a conductive path to complete a circuit and activate an alarm.

The goal of Shimizu appears to be merely to detect and indicate that a leak has occurred when a sufficient amount of electrolyte has leaked onto the film between the contacts. Thus, if an electrolyte leak occurs away from the film or away from the contacts no alarm will be activated. Further, Shimizu allows a leaked electrolyte to remain free where it can leak out of the battery casing to cause injury or damage.

Thus, there exists a need for a leak detector capable of detecting and indicating electrolyte leakage which occurs away from the leak detection means, such as electrical contacts. Further, there exist a need for a battery leak detector which will detect leaked electrolyte and prevent the electrolyte from further escaping to damage equipment or injure users.

SUMMARY OF THE INVENTION

The present invention provides a better solution to solving the problems in the art described above by providing a battery leakage detector and indicator that absorbs leaked electrolyte to prevent its further escape and that further propagates the absorbed electrolyte within itself so that the leakage detection means is activated regardless of whether the leak is occurring in the vicinity of the detection means.

Generally described, the present invention uses a wicking material to absorb and propagate leaked electrolyte. The wicking material is placed along select portions of the inside bottom of a battery casing so that leaking electrolyte will necessarily contact the, wicking material. Leaking electrolyte is absorbed into and propagated within the wicking material. Thus, the leaked electrolyte is propagated to the leakage detection means which then indicates to the user existence of the leak. Further, the leaked electrolyte is temporarily contained in the wicking material so that it cannot immediately escape outside the battery casing. Early knowledge of the leak allows the user to remove the battery from use before any damage to the equipment or injury to the user can occur.

In one embodiment of the present invention, the wicking material is impregnated with a substance that chemically reacts to change the color when contacted by an electrolyte. In this embodiment a window in the battery casing allows the user to routinely check the material for a change in color which would indicate cell leakage.

In the second embodiment of the present invention, spaced apart electrodes are embedded into the wicking material. The electrodes are wired through the battery to a monitoring circuit and alarm device. The presence of electrolyte in the wicking material creates a conductive path between the electrodes that completes the circuit and activates the alarm.

Thus, it is an object of the present invention to provide an improved battery case leakage detector and indicator.

It is a further object of the present invention to provide an improved battery case leakage detector and indicator for metal-air batteries.

It is a further object of the present invention to provide a battery case leakage detector and indicator that absorbs leaked electrolyte be, fore it can escape from the battery casing and pose a hazard to users or equipment.

It is a further object of the present invention to provide an improved battery case leakage detector and indicator that propagates leaked electrolytes within itself such that remote leaks will be propagated to the leakage detection means.

Further objects, features and advantages of the present invention will become apparent upon reviewing the following description of preferred embodiments of the invention, when taken in conjunction with the drawings and appended claims.

BRIEF DESCRIPTION OF THE DRAWINGS

FIG. 2 is a perspective view from a different angle of the metal-air battery of FIG. 1 which incorporates the first embodiment of an electrolyte leakage detector in accordance with the present invention.

FIG. 3 is a diagrammatic view of the metal-air battery of FIG. 1 showing the position of the cell stacks, the gasketing material and the wicking material within the battery casing.

FIG. 4 is a perspective view of a metal-air cell stack showing the flow paths of leaked electrolyte to the wicking material.

FIG. 5 is a perspective view of a metal-air battery which incorporates a second embodiment of an electrolyte leakage detector in accordance with the present invention FIG. 6 is a portion of FIG. 5 showing a detailed view of an electrode pair embedded into the wicking material and held by staples.

FIG. 7 is an exploded view of the control section casing of the battery of FIG. 5 showing the alarm indication means used in connection with the second embodiment of the present invention.

DETAILED DESCRIPTION

Figure 1:
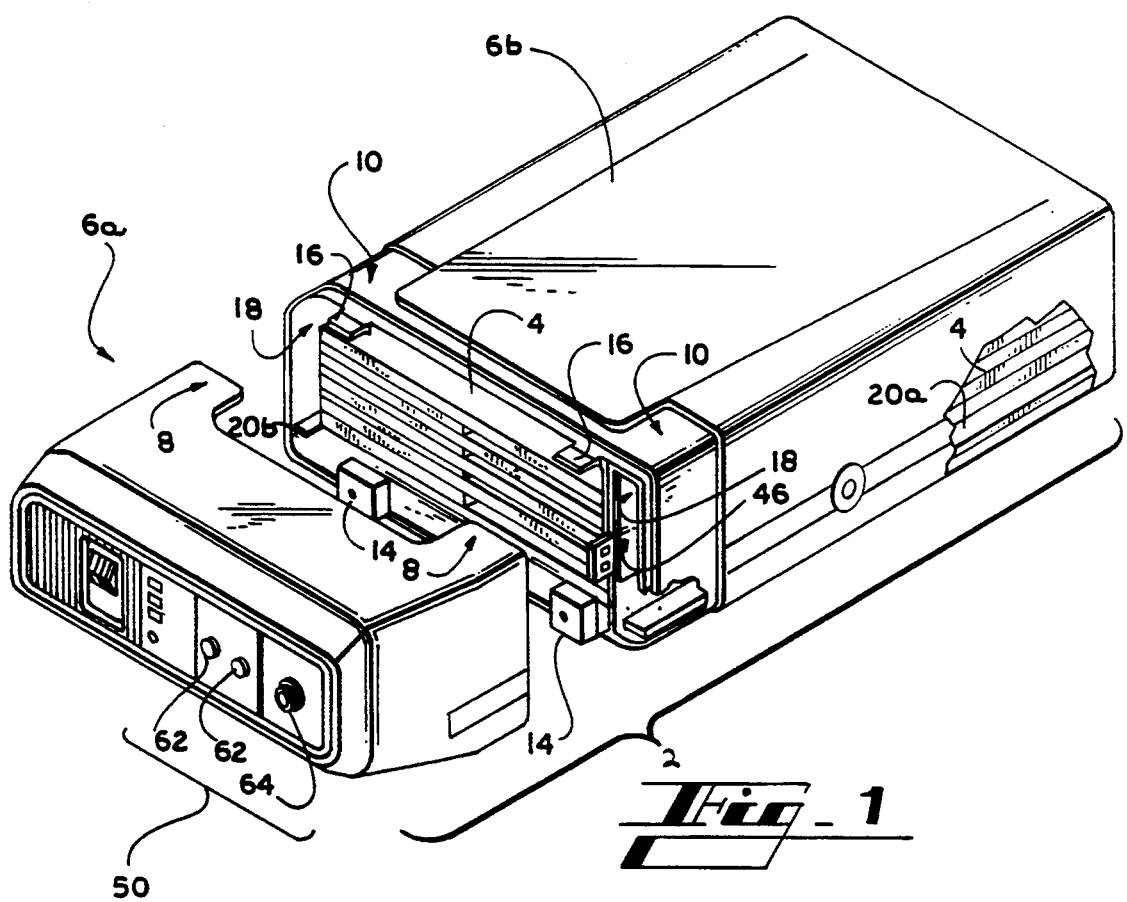
FIG. 1 is a perspective view of a metal-air battery which incorporates a first embodiment of an electrolyte leakage detector in accordance with the present invention.

Referring now in more detail to the drawings, in which like numerals refer to like parts throughout the several views, FIGS. 1 and 2 show a metal-air battery pack 2 in accordance with the present invention. The battery 2 includes cell stacks 4, which consist of a front stack 4a, a center stack 4b, and a rear stack 4c (not shown in FIGS. 1 or 2). Cell stacks 4 are enclosed within a two-part casing 6, which consists of a control section 6a and a cell stack section 6b. The control casing 6a includes extended sides 8 which overlap indentations 10 of the cell stack casing 6b. The two-part casing 6 is aligned by rearward facing guide pins 12 (shown in FIG. 2) which fit into the forward facing guide blocks 14. The casing 6 is held together by locking clips 16.

Control casing 6a includes a control panel 50 which holds discharge receptors 62 and a recharge receptor 64. The receptors are connected to the battery cells 22 through wiring 60, control panel receptor 54, printed circuit board connector 52, and printed circuit board 46 (not shown in FIGS. 1 or 2).

Battery casing 6 isolates cell stacks 4 from the outside air with the exception of one or more ventilation openings (not shown). Thus, the cell stacks 4 cannot be visually inspected without dismantling the battery pack 2.

The cell stack casing 6b is substantially wider than cell stacks 4, leaving an open space 18 running along both sides of cell stacks 4. Wicking material 20 is disposed along the bottom of the entire length of open areas 18. Wicking material 20 is further disposed along the bottom of the back part of control casing 6a between guide pins 12a and 12b (shown in FIG. 2).

Wicking material 20 may consist of a batt or fabric of woven or non-woven fibers and or filaments. However, batts or fabrics of neon-woven fibers or filaments are preferred due to their faster rates of absorption and propagation. Further, the wicking material 20 may include nonwoven fabrics, such as paper toweling, formed from cellulosic fibers or nonwoven fabrics formed of polymeric fibers or filaments, such as nylon or rayon. Nonwoven batts formed of nylon is the preferred wicking material 20. Wicking material 20 may additionally be any type of material capable of absorbing and propagating liquids within itself, except that for the second embodiment described below, the material must be essentially non-conductive.

FIG. 4 shows center cell stack 4b. Each individual cell 22 includes a metal anode 24 in an air cathode 26 separated by an aqueous electrolyte 28. Zinc is the preferred metal for anode 24 because of the availability, energy density, safety, and relatively low cost. KOH is the preferred electrolyte 28.

Below the air cathode 26 of each cell 22 is air flow space 34. Air flow space 34 is created by gasketing material 29. Gasketing material 29 is installed along the right side of cell stacks 4a, 4b and 4c, along the back wall of cell stack 4c, and along the left side of cell stacks 4c and 4b. Additionally, gasketing material 29 is installed along the front left half of cell stack 4a and through the middle of cell stacks 4a and 4b (shown in FIG. 3). Gasketing material 29 serves as an air deflector forcing air flowing from fan 31 to travel through the right half of cell 4a to the right half of cell 4b through cell 4c from right to left, through the left half of cell 4b and into the left half of cell 4a before flowing out of open space 18 along the left side of cell stack 4a.

The electrolyte 28 may leak out of a cell 22 through a crack 30 in the cell casing or through the air permeable cathode 26. Electrolyte 28 leaking through crack 30 of cell 22 will flow along path 32, which is down the side of a cell stack 4b onto wicking material 20a. Electrolyte 28 leaking through the air permeable cathode 26 is channeled by gasketing material 29 and will flow along path 36, which is into and along air passageway 34 until it reaches the front of the cell stacks 4 where it will flow down the front of cell stacks 4 onto wicking material 20c.

In one embodiment of the present invention (FIGS. 1 and 2), wicking material 20 is impregnated with an substance that chemically reacts to change color when contacted by an electrolyte 28. In this embodiment, a window 40 is installed in cell stack casing 6b to provide the user with a means of checking wicking material 20 for a change in color of the substance which would indicate leakage of electrolyte 28 from a cell 22. Window 40 is preferably located at or near the bottom of cell stack casing 6b from where wicking material 20 may be easily observed for a substance color change.

In this embodiment, the various sections of wicking material 20 are interconnected to allow leaking electrolyte absorbed by any section to be propagated into the wicking material section in front of window 40, where the change in color of the substance may be observed. In the preferred embodiment wicking material section 20c includes comers 42 to connect it with wicking material sections 20a and 20b, disposed along the sides of the cell stack casing 6b. Connecting corners 42 allow leaking electrolyte absorbed by wicking material section 20b, for example, to be propagated through section 20c into section 20a such that the substance in front of window 40 will change color and indicate the electrolyte leak.

While any substance that changes colors when in contact with an electrolyte can be employed, the preferred substance is phenolphthalein. For example, in a zinc-air battery 2 containing a KOH electrolyte 28, phenolphthalein will chemically react with KOH absorbed into wicking material 20 to change from clear to a pinkish-red.

The second embodiment of the present invention is described in connection with the same battery configuration as shown in FIG. 1. In this embodiment wicking material 20 is a nonwoven batt of nylon fibers, which when dry, is essentially non-conductive.

As shown in FIGS. 3, 5 and 6 pairs of spaced apart electrodes 44 are embedded into wicking material sections 20a, 20b and 20c. Each electrode is embedded in wicking material 20 by means of a staple 48 (shown in FIG. 6). The electrode pairs 44 are wired to printed circuit board 46 which contains a monitoring circuit (not shown).

When electrolyte 28 leaks from a cell 22 onto wicking material 20, it is propagated within wicking material 20 to the area between a pair of spaced apart electrodes 44. The electrolyte 28 creates a conductive path between the electrodes 44 to complete the monitoring circuit. Upon completion of the monitoring circuit, a signal is sent from the printed circuit board 46 to control panel 50 through printed circuit board connector 52 and control panel receptor 54 (shown in FIG. 2).

As shown in FIG. 7, the leakage indication signal may be used to activate a visual alarm by energizing a light emitting diode (LED) 56. Also, the signal can be used to activate an audible alarm 58. Further, when the battery 2 is used in connection with a computer (not shown) or other such device having a video display screen, the signal can be displayed on the screen. The alarms on control panel 50 are connected to the control panel receptor 54 by wiring 60.

In this embodiment, it is preferred to use three electrode pairs 44, one pair in section 20a, one in section 20b and one in section 20c of the wicking material. However, it is only necessary that one pair of electrodes be used for each separate section of wicking material. The phase "separate section of wicking material" is used to mean a section of wicking material 20 that is not interconnected with another section of wicking material which contains a pair of electrodes 44. Thus, a single pair of electrodes 44 which are embedded into a single section of wicking material, such as section 20a, may be used with connecting comers 42 (FIG. 2). In this case, an electrolyte 28 leak through the air permeable cathode 36, for example, will flow along path 36 onto wicking material 20c and be propagated through connecting comer 42 into wicking material 20a. The presence of electrolyte in wicking material 20a will create a conductive path between that lone electrode pair and complete the monitoring circuit on the printed circuit board 46.

From the foregoing description of the preferred embodiments and the several alternatives, other alternative constructions of the present invention may suggest themselves to those skilled in the art. Therefore, the scope of the present invention is to be limited only by the claims below and equivalents thereof.

I claim:

1. A battery leakage detector comprising:
    an electrochemical cell contained within a housing, said cell including an electrically conductive liquid;
    an absorbent material disposed within said housing and being essentially electrically non-conductive when dry and electrically conductive when wet with the conductive liquid;
    electrical contacts in contact with said absorbent material, said contacts spaced apart from one another; and
    an electrical circuit connected to said contacts, said electrical circuit being responsive to the electrical conductivity of said conductive liquid in said absorbent material.
2. A battery leakage detector as recited in claim 1, wherein said absorbent material propagates the conductive liquid within its volume.
3. A battery leakage detector as recited in claim 1 or 2, wherein said electrochemical cell is a metal-air battery.
4. A battery leakage detector as-recited in claim 3, wherein said metal-air battery is a zinc-air battery.
5. A battery leakage detector as recited in claim 1 or 2, wherein said conductive liquid is an electrolyte.
6. A battery leakage detector as recited in claim 5, wherein said electrolyte is a solution of potassium hydroxide.
7. A battery leakage detector as recited in claim 1 or 2, wherein said absorbent material is formed of cellulosic fibers.
8. A battery leakage detector as recited in claim 7, wherein said absorbent material is paper toweling.
9. A battery leakage detector as recited in claim 1 or 2, wherein said absorbent material is formed of polymeric fibers.
10. A battery leakage detector as recited in claim 9, wherein said polymeric fibers are nylon.
11. A battery leakage detector as recited in claim 9, wherein said polymeric fibers are rayon.

* * * * *